(12) United States Patent
May et al.

(10) Patent No.: US 6,366,522 B1
(45) Date of Patent: Apr. 2, 2002

(54) METHOD AND APPARATUS FOR CONTROLLING POWER CONSUMPTION OF AN INTEGRATED CIRCUIT

(75) Inventors: Marcus W. May; Daniel Mulligan, both of Austin, TX (US)

(73) Assignee: Sigmatel, Inc, Austin, TX (US)

(*) Notice: Subject to any disclaimer, the term of this patent is extended or adjusted under 35 U.S.C. 154(b) by 0 days.

(21) Appl. No.: 09/716,616

(22) Filed: Nov. 20, 2000

(51) Int. Cl.[7] ................................................ G06F 1/26
(52) U.S. Cl. ..................... 365/227; 713/320; 713/322
(58) Field of Search ............................. 365/226, 227, 365/228, 229; 713/320, 322

(56) References Cited

U.S. PATENT DOCUMENTS 5,825,674 A * 10/1998 Jackson ....................... 713/321
6,067,627 A * 5/2000 Reents ......................... 713/324

* cited by examiner

*Primary Examiner*—Shawn Riley
(74) *Attorney, Agent, or Firm*—Timothy W. Markison

(57) ABSTRACT

A method and apparatus for controlling power consumption of an integrated circuit include processing that begins by producing a system clock from a reference clock based on a system clock control signal. The reference clock may be generated from an external crystal oscillator circuit operable to produce a reference clock at a desired frequency. The processing continues by regulating at least one supply from a power source and an inductor based on a power supply control signal. The processing continues by producing the system clock control signal and the power supply control signal based on a processing transfer characteristic of a computational engine and processing requirements associated with processing at least a portion of an application by the computational engine.

22 Claims, 5 Drawing Sheets

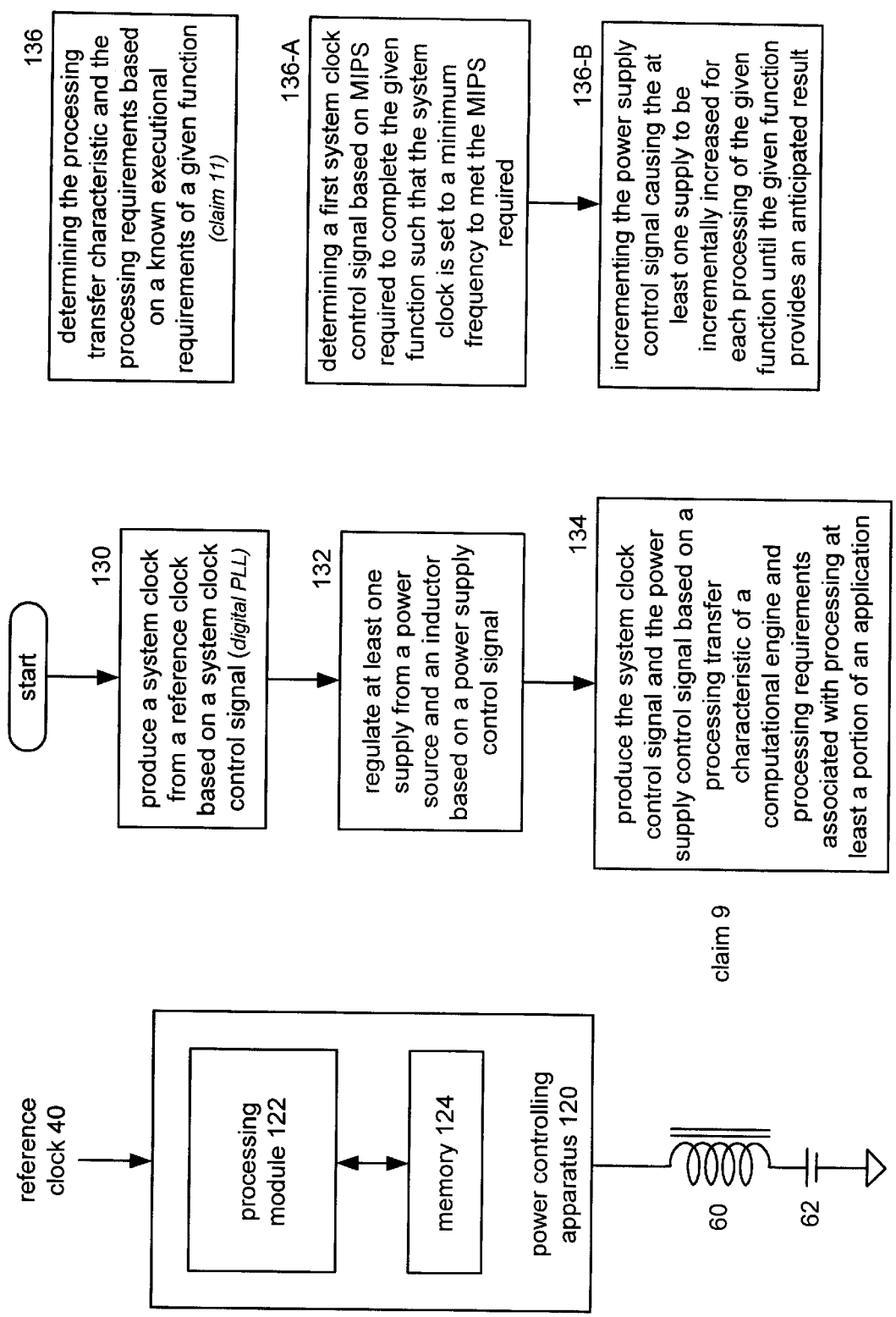

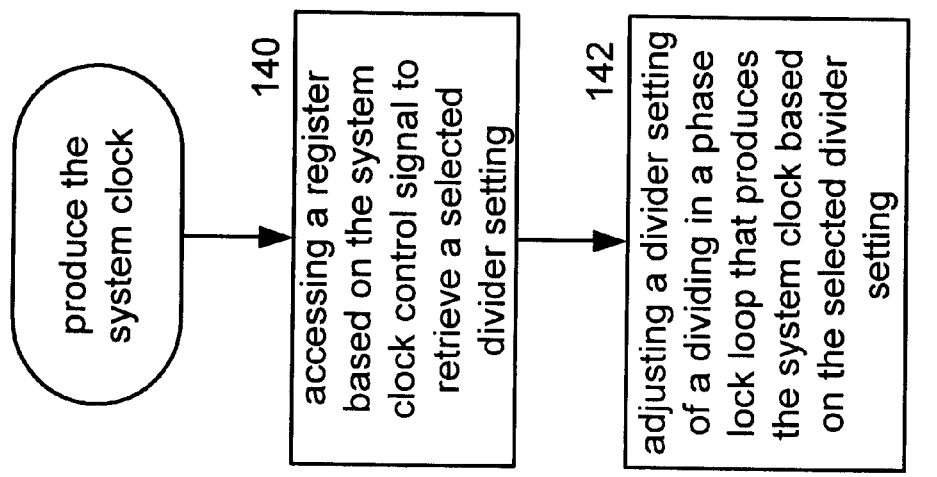
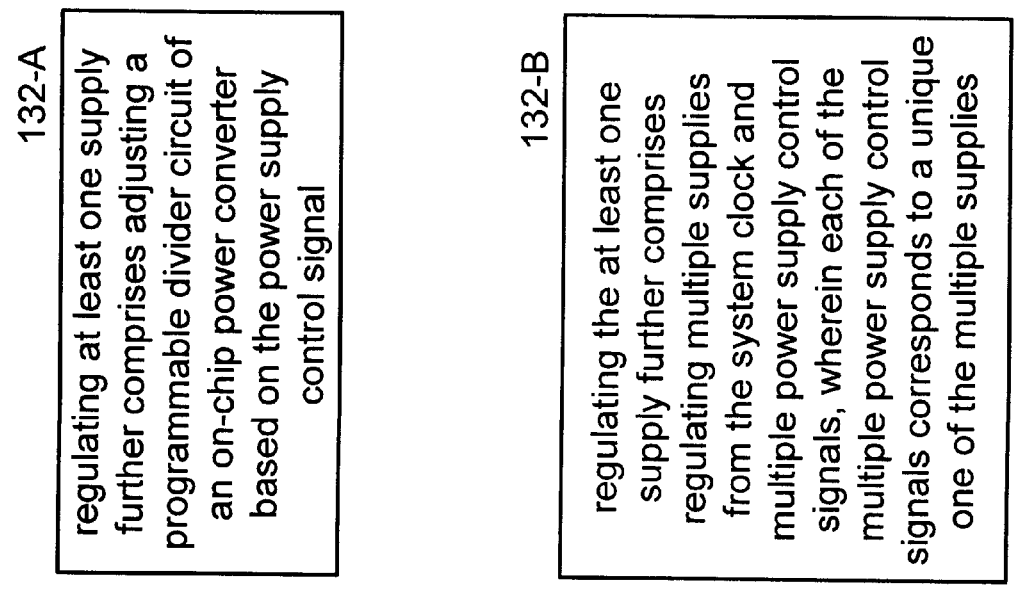
FIG. 7

METHOD AND APPARATUS FOR CONTROLLING POWER CONSUMPTION OF AN INTEGRATED CIRCUIT

TECHNICAL FIELD OF THE INVENTION

This invention relates generally to integrated circuits and more particularly to controlling power consumption by an integrated circuit.

BACKGROUND OF THE INVENTION

Integrated circuits (IC's) are known to be used in a wide variety of electronic devices. For example, personal computers, cellular telephones, compact disk players, MP3 players, et cetera all include integrated circuits. Such integerated circuits are comprised of a plurality of functional circuit blocks that perform desired functions. Transistors, resistors and capacitors generally comprise the circuitry found in each circuit block.

As is known, transistor performance (e.g. transfer characteristics, on resistance, slew rate, et cetera) varies depending on the supply voltage. The lower the supply voltage, the lower the transistor performance and slew rate, but the less power it consumes. Conversely, the higher the supply voltage, the higher the performance and slew rate, but more power is consumed as such, the power consumption by an integrated circuit is very much dependent on the supply voltage and transistors that comprise the circuit blocks.

As processing speeds of microprocessors, digital signal processors, et cetera increase, such devices are capable of processing larger software applications in less time. While some applications push the processing engine to its processing speed limits, most applications do not. However, the processing engine must be designed to support the highest processing requirements. Thus, the processing engine needs to have a supply voltage and system clock to handle the most taxing applications. When the processing engine is executing less taxing applications, the voltage and system clock remain the same, thus power consumption of the integrated circuit remains the same even though the application could accurately be performed with a lower supply voltage and/or a lower system clock.

Therefore, a need exists for a method and apparatus that adjust the system clock and/or the supply voltage based on the processing capabilities of an integrated circuit and the application being performed to conserve power.

BRIEF DESCRIPTION OF THE DRAWINGS

FIG. 5 illustrates a schematic block diagram of a power controlling apparatus in accordance with the present invention:

FIG. 6 illustrates a logic diagram of a method for controlling power consumption of an integrated circuit in accordance with the present invention; and FIG. 7 illustrates a logic diagram of further processing of steps in FIG. 6.

DETAILED DESCRIPTION OF THE PREFERRED EMBODIMENT

Generally, the present invention provides a method and apparatus for controlling power consumption of an integrated circuit. Such a method and apparatus include processing that begins by producing a system clock from a reference clock based on a system clock control signal. The reference clock may be generated from an external crystal oscillator circuit operable to produce a reference clock at a desired frequency. The processing continues by regulating at least one supply from a power source and an inductor based on a power supply control signal, or a linear regulator. The processing continues by producing the system clock control signal and the power supply control signal based on a processing transfer characteristic of a computational engine and processing requirements associated with processing at least a portion of an application by the computational engine. With such a method and apparatus, power consumption of an integrated circuit can be controlled, and thereby reduced, based on the application being performed by the computational engine and the capabilities of the computational engine within the integrated circuit thereby reducing power consumption.

Figure 1:
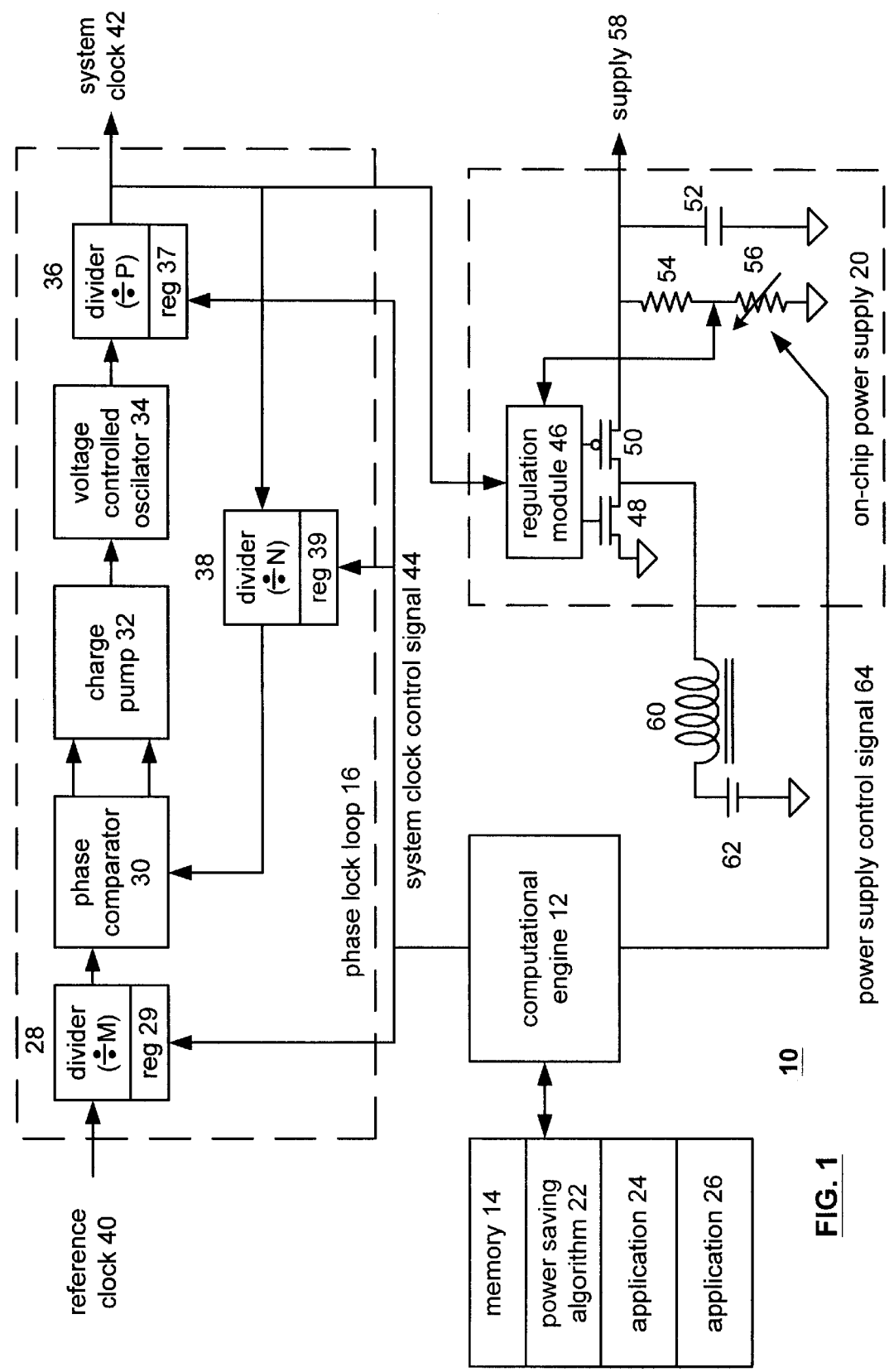
FIG. 1 illustrates a schematic block diagram of an integrated circuit in accordance with the present invention.

The present invention can be more fully described with reference to FIGS. 1 through 7. FIG. 1 illustrates an integrated circuit 10 that includes a phase lock loop 16, a computational engine 12, memory 14 and an on-chip power supply 20. The integrated circuit 10 is operably coupled to an external inductor 60 and an external power source 62 (e.g. a battery). The computational engine 112 may be a microprocessor, compressor, digital signal processor, logic circuit, state machine, analog circuit, and/or any circuitry that manipulates signals (analog or digital) based on operational instructions. The memory 14 may be on-chip or off-chip and stores a power savings algorithm 22, and at least one application. In this illustration the memory is storing two applications 24 and 26. As one of average skill in the art will appreciate, many more applications may be stored in memory 14 than the two illustrated.

The phase lock loop 16 is shown to include a $1^{st}$ divider 28, a $1^{st}$ register 29, a phase comparator 30, a charge pump 32, a voltage controlled oscillator 34, a $2^{nd}$ divider 36, a $2^{nd}$ register 37, a $3^{rd}$ divider 38, and a $3^{rd}$ register 39. In practice, the phase lock loop 16 may include one, two, or three of the dividers 28, 36 and 38 to produce the system clock 42 from the reference clock 40. The registers 29, 37 and 39 each store values to represent the corresponding divider value. For example, divider 28 utilizes one of the values in register 29 to produce a (÷M) function. Similarly, divider 36 utilizes values in register 37 to produce a (÷P) value and divider 38 utilizes values in register 39 to produce a (÷N) value.

In operation, the computational engine 12, based on the execution of the power saving algorithm 22, produces a system clock control signal 44. The system clock control signal 44 is determined based on the particular application or applications being performed by the computational engine 12 and the processing requirements associated therewith. For example, if the computational engine is performing application 24, and application 24 has a processing requirement of five MIPS (millions of instructions per second), the power savings algorithm 22 would cause the computational engine 12 to set the system clock control signal 44 such that the system clock 42 produces at least a 5 Mhz clock. The phase lock loop 16 receives the system clock control signal 44, which is used to address at least one of registers 29, 37 or 39. Based on the addressed value in the corresponding register, the divider 28, 36 or 38 is set to the corresponding value. Once this is done, the phase lock loop 16 performs in a conventional manner.

In addition to generating the system clock control signal 44, the computational engine 12 also produces a power supply control signal 64. The computational engine 12 provides the power supply control signal 64 to the on-chip power supply 20. The on-chip power supply 20 includes a regulation module 46, an N-channel transistor 48, a P-channel transistor 50, a programmable divider network 54 and 56 and a capacitor 52.

Based on the power supply control signal 64, the on-chip power supply 20 sets the programmable divider such that the regulation module produces supply 58 at a desired value. For example, once the system clock 42 has been set, the supply 58 may be varied such that the processing of the application 24 with the computational engine 12 is optimized. This concept will be discussed in treater detail with reference to FIGS. 3, 4, 6 and 7. For a more detailed discussion on the on-chip power supply 20, refer to co-pending Patent Application, entitled METHOD AND APPARATUS FOR REGULATING A DC OUTLET VOLTAGE, having a Ser. No. of 09/551,123, and a filing date of Apr. 18, 2000.

Figure 2:
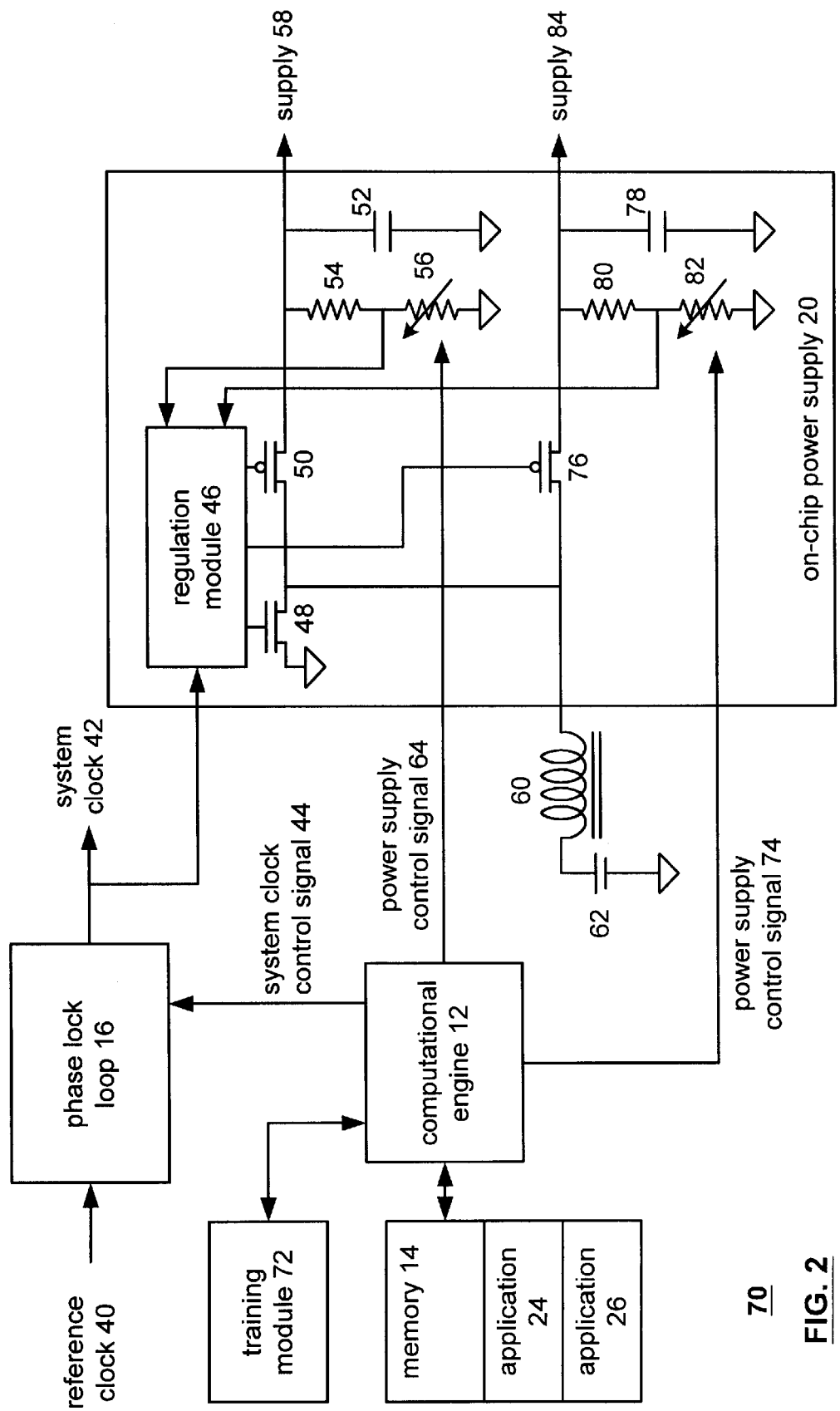
FIG. 2 illustrates a schematic block diagram of an alternate integrated circuit in accordance with the present invention.

FIG. 2 illustrates a schematic block diagram of an alternate integrated circuit in accordance with the present invention. The integrated circuit 70 includes the memory 14, the computational engine 12, the phase lock loop 16, the on-chip power supply 20 and a training module 72. The integrated circuit 70 is coupled to an external inductor 60 and an external power source 62. As with the integrated circuit 10 of FIG. 1, the memory 14 may also include an off-chip portion for storing multiple applications. In this configuration, the training module 72 establishes the rate at which the system clock 42 will be generated and the values of supply 58 and supply 84.

In this embodiment, the on-chip power supply 20 produces two supplies 58 and 84. The regulation module 46 regulates the supplies 58 and 84 by controlling switching of transistors 48, 50 and 76. A $2^{nd}$ feedback divider 80 and 82 is provided to sample the supply 84, which is produced across capacitor 78.

Figure 3:
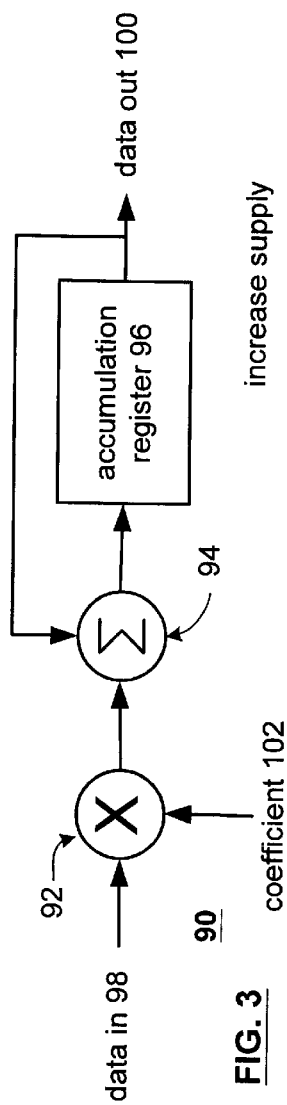
FIG. 3 illustrates a schematic block diagram of a multiply accumulator in accordance with the present invention.
Figure 4:
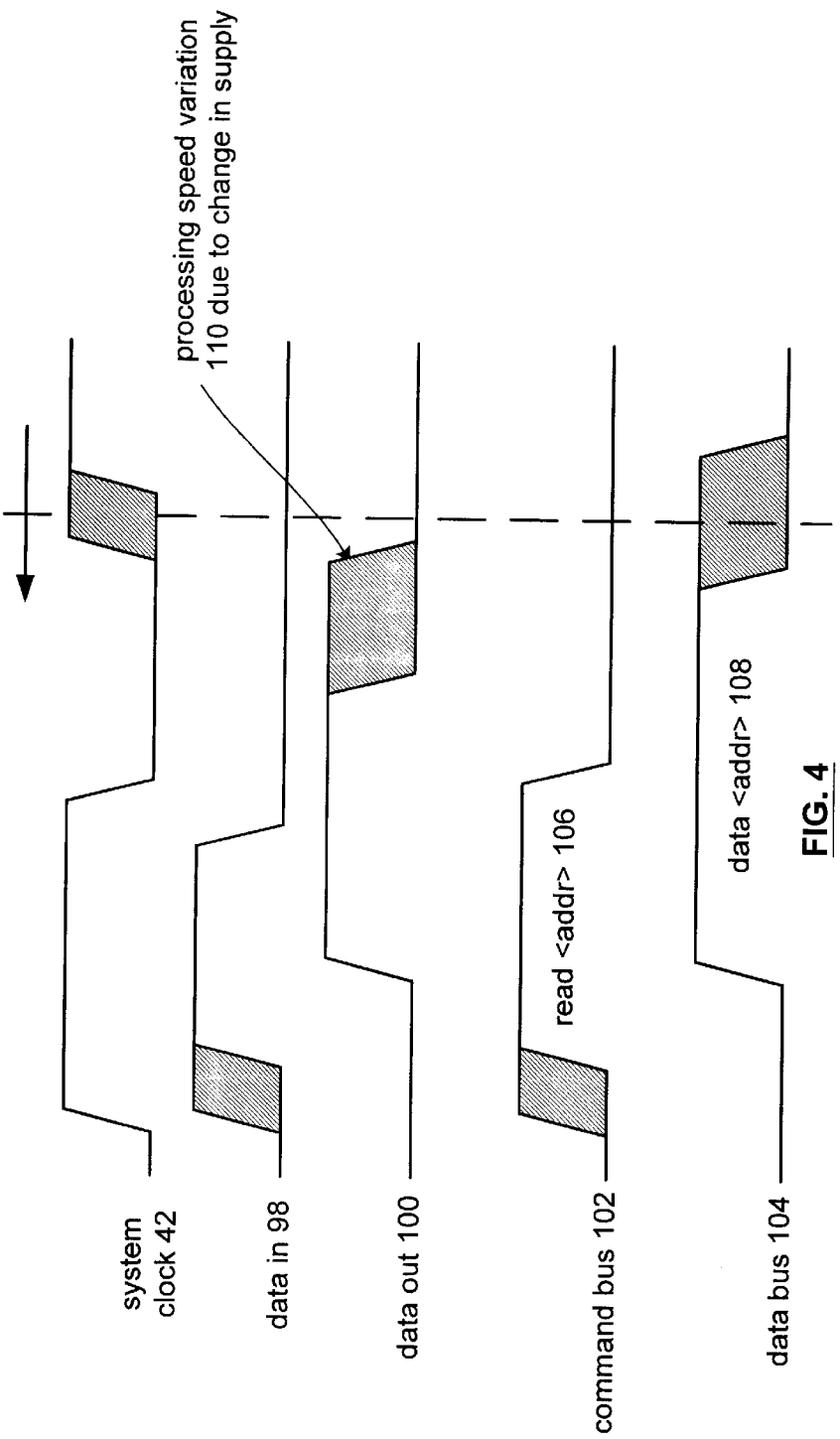
FIG. 4 illustrates a graphical representation of adjusting the supply clock and/or the supply in accordance with the present invention.

The training module 72, based on the application to be executed by the computational engine 12 establishes the rate of the system clock 42 and the values of supplies 58 and 84. To do this, the training module 72 determines the processing transfer characteristics of the computational engine. The processing transfer characteristics of the computational engine include propagation delays through logic circuits, slew rates of transistors within memory, logic circuits, read/write processing speed, et cetera, and any other characteristic of a logic circuit, digital signal processor, microprocessor, et cetera that corresponds to the speed at which digital information may be processed. FIGS. 3 and 4 illustrate embodiments performed by the training 2 module 72.

FIG. 3 illustrates a schematic block diagram of a multiply accumulator 90 that may be contained within computational engine 12 or within the training module 72, which may be used in a particular application. The multiply accumulator 90 includes a multiplier 92, an adder 94, and an accumulation register 96. In operation, a data input 98 is multiplied with a coefficient 102 to produce a resultant. The resultant is summed via adder 94 with previous summed data 100 to produce a new accumulated value that is stored in accumulation register 96. The processing transfer characteristics of the computational engine will map the processing characteristics of the multiply accumulator 90 and will vary depending on the voltage set for the supply. What voltage to set for the supply is determined by experimentation once the processing requirements of an application are determined (i.e. the MIPS required). For example, if the MIPS required is one, then the clock rate is set to 1 MHz, thus yielding a period of 1 microsecond. The supply voltage is set for a predetermined low value, then a multiply accumulate function is processed in a known number of clock cycles. If the accumulated value is as expected, the supply voltage is set to this predetermined low level. If, on the other hand, the accumulated value is not as expected, the supply voltage is increased at an incremental rate of 10 mVolts to 500 mVolts, and the accumulation process is repeated. Once the accumulated value is as expected, i.e., the correct value has been accumulated, the supply is set to this value.

FIG. 4 illustrates a graphical representation of determining the processing transfer characteristics and processing requirements associated with processing at least a portion of an application. The application may include the MIPS required for processing the entire application or it may include separate indications for each sub routine contained therein. Alternatively, a default processing requirement may be selected for certain applications or all applications. As one of average skill in the art will appreciate, there is a multitude of ways in which the processing requirements associated with an application may be derived.

Based on the most difficult processing requirements of an application, the system clock 42 is set to provide a clock that at least meets the processing requirements. For example, if the processing requirement is 6 MIPS, the system clock will be set at a rate of at least 6 Mhz. Having done this, the supply 58 or 84, which may be a regulated voltage supply or a regulated current output, is varied to change the processing speed of the circuitry within the computational engine. As shown in FIG. 4, the processing speed of data input 98 may vary 110 due to changes in the supply. As is known, the lower the supply, the longer it takes digital circuitry to reach a final logic 0 or logic 1 state. As such, as the supply is increased, the processing speed of inputting data and outputting data 100 is increased. The cross hatched areas of data in 98 and data out 100 correspond to the variations in processing speeds of inputting, data and outputting data of the multiply accumulator 90 of FIG. 3 as the supply voltage is varied. The lower the supply voltage is, the longer it takes to input data and output data. If the supply is too low, the data output 100 will not occur before the next given number of cycles of the system clock 42, i.e., operational period of the system. When this occurs, the supply is set too low. Accordingly, the supply is increased, as shown by the arrow associated with the vertical dash line until the processing speed of the multiply accumulator 90 produces a digital output 100 that occurs just within the period of the system clock 42. A further increase in supply provides no added processing benefit; it only increases the power consumption.

Thus, the supply is set so that the data output 100 just completes prior to the beginning of the next clock cycle of system clock 42.

As an alternate processing of the training module 72, a read function may be processed by the computational engine in conjunction with the transfer module. On the command bus 102, a read instruction 106 is placed. Again, based on the supply voltage, the speed of placing of an instruction on the command bus varies. The higher the voltage, the more quickly the command is placed on the bus. Once the read instruction 106 has been interpreted by memory, a data word 108 is placed on a data bus 104. Similarly, the speed at which data may be placed on the data bus 104 is dependent on the supply voltage. The lower the supply voltage, the longer it takes. Thus, to optimize power consumption, the supply voltage is increased until the point where the data word 108 is placed on the data bus 104 is just within the end of the current clock cycle 42 or the clock cycle when the data is expected. By controlling the system clock and supply voltage in this manner, power consumption of an integrated circuit may be optimized based on the corresponding application being performed and the processing characteristics of the computational engine. As one of average skill in the art will appreciate, the computational engine may process multiple applications at a given time. Accordingly, the clock rate would be set such that the speed needed for processing multiple applications is met.

FIG. 5 illustrates a schematic block diagram of a power efficient integrated circuit that includes a power controlling apparatus 120 operably coupled to an external inductor 60 and an external power source 62. The power controlling apparatus 120 includes a processing module 122 and a memory 124. The power controlling apparatus 120 is also operably coupled to receive a reference clock 40.

The processing module 122 may be a single processing device or a plurality of processing devices. The processing device may be a microprocessor, microcontroller, microcomputer, digital signal processor, logic circuit, state machines, and/or any device that manipulates signals (analog or digital) based on operational instructions. The memory 124 may be a single memory device or a plurality of memory devices. Such a memory device may be a read only memory, floppy disk memory, random access memory, external memory, and/or any device that stores digital information. Note that when the processing module 122 implements one or more of its functions via a state machine or logic circuit, the memory storing the corresponding operational instructions is embedded within the circuitry comprised in the state machine or logic circuit. The operational instructions stored in memory 124 and executed by processing module 122 are further illustrated in FIGS. 6 and 7.

FIG. 6 illustrates a logic diagram of a method for controlling power consumption of an integrated circuit. The process begins at Step 130 where a system clock is produced from a reference clock based on a system clock control signal. As is known, a processing module may include functional components to perform a digital, or analog, phase lock loop that is controlled by the system control clock signal. The process then proceeds to Step 132 where at least one supply is regulated from a power source and an inductor based on a power supply control signal or from a linear regulator.

The process then proceeds to Step 134 where the system clock control signal and the power supply control signal are produced based on a processing transfer characteristic of a computational engine and processing requirements associated with processing at least a portion of an application. Note that the computational engine may be included within the processing module 122 or a separate device that includes logic circuitry a state machine, digital signal processor, digital circuitry, analog circuitry, and/or a combination thereof.

The processing transfer characteristics of the computational engine may be further determined as described in Step 136. At Step 136 the processing transfer characteristic and the processing requirements are determined based on a known executional requirements of a given function. The known executional requirement includes at least one of a specification of millions of instructions per second (MIPS) required to process at least a portion of an application, timings requirement between dependent operations (e.g. the timing requirement between inputting a request to RAM and receive data back), and speed of execution (e.g. slew rate of transistors within the circuitry comprising the computational engine).

Steps 136-A and 136-B further illustrate the determination of the transfer characteristics and the processing requirements. At Step 136-$a$ a $1^{st}$ system clock control signal is determined based on the MIPS required to complete the given function such that the system clock is set to a minimum frequency to meet the MIPS required. For example, if the processing requirements of the known function is 6 MIPS, the system clock is set to a value of 6 Mhz or slightly greater than 6 Mhz. At Step 136-B, the power supply control signal is incremented causing the at least one supply to be incrementally increased for each processing of the given function until the given function provides an anticipated result. This was illustrated and discussed with reference to FIG. 4 when processing the multiplied accumulate function and/or the read function.

FIG. 7 illustrates various processing steps that further describe corresponding steps of FIG. 6. Step 132-A further describes the regulation of at least one supply by adjusting a programmable divider circuit of the on-clip power supply based on thecontrol signal. Step 132-B further includes regulating the at least one supply by regulating multiple supplies from the system clock and multiple power supply control signals, where each of the multiple power supply control signals corresponds to an unique one of the multiple supplies. This was illustrated in FIG. 2 where power supply control signal 64 regulates supply 58 and power supply control signal 74 regulates supply 84.

The production of the system clock may be further described with reference to Steps 140 and 142. At Step 140, a register is accessed based on the system clock control signal to retrieve a selected divider setting. The process then proceeds to Step 142 where a divider setting of a divider in the phase lock loop is adjusted to produce the system clock in accordance with the selected divider setting.

The preceding discussion has presented a method and apparatus for controlling power consumption within an integrated circuit. By adjusting the system clock and/or the supply based on application being executed by the intergated circuit, power consumption may be optimized. As one of average skill in the art will appreciate, other embodiments may be derived from the teachings of the present invention without deviating from the scope of the claims. For example a buck converter may be instead of a boost converter, or a combination of a buck and boost converter may be used.

What is claimed is:

1. A power efficient integrated circuit comprising:
   phase lock loop operably coupled to receive a reference clock and to produce therefrom a system clock based on a system clock control signal;
   on-chip power supply control module operably coupled to regulate at least one supply from a power source and an inductance based on a power supply control signal;
   memory operably coupled to store at least one application; and
   computational engine operably coupled to produce the system clock control signal and the power supply control signal based on a processing transfer characteristic of the computation engine and processing requirements associated with processing at least a portion of the at least one application.

2. The power efficient integrated circuit of claim 1, wherein each of the at least one application comprises the processing requirements for at least one of: each sub-routine contained in the application and the application.

3. The power efficient integrated circuit of claim 1, wherein the computational engine further comprises:
   training module operably coupled to determine the processing transfer characteristic and the processing requirements based on a known executional requirements of a given function, wherein the known executional requirements includes at least one of: millions of instructions per second (MIPS), timing requirement between dependent operations, and speed of execution.

4. The power efficient integrated circuit of claim 3, wherein the given function further comprises at least one of: reading from memory, executing a test multiply-accumulate function, and propagating data through combinational logic circuit.

5. The power efficient integrated circuit of claim 4, wherein the training module further comprises:
   system clock determining module operably coupled to determine a first system clock control signal based on MIPS required to complete the given function such that the system clock is set to a minimum frequency to met the MIPS required; and
   power supply determining module operably coupled to increment the power supply control signal causing the at least one supply to be incrementally increased for each processing of the given function until the given function provides an anticipated result.

6. The power efficient integrated circuit of claim 1, wherein the phase lock loop further comprises:
   at least one divider module; and
   a register operably coupled to the at least one divider module, wherein the register stores various divider values that are selected based on the system clock control signal.

7. The power efficient integrated circuit of claim 1, wherein the on-chip power supply further comprises a programmable divider circuit that is programmed based on the power supply control signal.

8. The power efficient integrated circuit of claim 1, wherein the at least one supply further comprises multiple supplies that are produced from the system clock and multiple power supply control signals, wherein each of the multiple power supply control signals corresponds to a unique one of the multiple supplies.

9. A method for controlling power consumption of an integrated circuit, the method comprises the steps of:
   producing a system clock from a reference clock based on a system clock control signal;
   regulating at least one supply from at least one of: a linear regulator and a power source and an inductance based on a power supply control signal; and
   producing the system clock control signal and the power supply control signal based on a processing transfer characteristic of a computation engine and processing requirements associated with processing at least a portion of an application by the computation engine.

10. The method of claim 9 further comprises retrieving the processing requirements from the application.

11. The method of claim 9 further comprises:
   determining the processing transfer characteristic and the processing requirements based on a known executional requirements of a given function, wherein the known executional requirements includes at least one of: millions of instructions per second (MIPS), timing relationship between dependent operations, and speed of execution.

12. The method of claim 11 further comprises:
   determining a first system clock control signal based on MIPS required to complete the given function such that the system clock is set to a minimum frequency to met the MIPS required; and incrementing the power supply control signal causing the at least one supply to be incrementally increased for each processing of the given function until the given function provides an anticipated result.

13. The method of claim 9, wherein the producing the system clock from a reference clock based on a system clock control signal further comprises:
   accessing a register based on the system clock control signal to retrieve a selected divider setting; and
   adjusting a divider setting of a dividing in a phase lock loop that produces the system clock based on the selected divider setting.

14. The method of claim 9, wherein the regulating at least one supply further comprises adjusting a programmable divider circuit of an on-chip power converter based on the power supply control signal.

15. The method of claim 9, wherein the regulating the at least one supply further comprises regulating multiple supplies from the system clock and multiple power supply control signals, wherein each of the multiple power supply control signals corresponds to a unique one of the multiple supplies.

16. An apparatus for controlling power consumption of an integrated circuit, the apparatus comprises:
   a processing module; and
   memory operably coupled to the processing module, wherein the memory includes operational instructions that cause the processing module to:
      produce a system clock from a reference clock based on a system clock control signal;
      regulate at least one supply from at least one of: a linear regulator and a power source and an inductance based on a power supply control signal; and
      produce the system clock control signal and the power supply control signal based on a processing transfer characteristic of a computation engine and processing requirements associated with processing at least a portion of an application by the computation engine.

17. The apparatus of claim 16, wherein the memory further comprises operational instructions that cause the processing module to retrieve the processing requirements from the application.

18. The apparatus of claim 16, wherein the memory further comprises operational instructions that cause the processing module to:
   determine the processing transfer characteristic and the processing requirements based on a known executional requirements of a given function, wherein the known executional requirements includes at least one of: millions of instructions per second (MIPS), timing relationship between dependent operations, and speed of execution.

19. The apparatus of claim 18, wherein the memory further comprises operational instructions that cause the processing module to:

determine a first system clock control signal based on MIPS required to complete the given function such that the system clock is set to a minimum frequency to met the MIPS required; and increment the power supply control signal causing the at least one supply to be incrementally increased for each processing of the given function until the given function provides an anticipated result.

20. The apparatus of claim 16, wherein the memory further comprises operational instructions that cause the processing module to produce the system clock from a reference clock based on a system clock control signal by:

accessing a register based on the system clock control signal to retrieve a selected divider setting; and adjusting a divider setting of a dividing in a phase lock loop that produces the system clock based on the selected divider setting.

21. The apparatus of claim 16, wherein the memory further comprises operational instructions that cause the processing module to regulate at least one supply by adjusting a programmable divider circuit of an on-chip power converter based on the power supply control signal.

22. The apparatus of claim 16, wherein the memory further comprises operational instructions that cause the processing module to regulate the at least one supply by regulating multiple supplies from the system clock and multiple power supply control signals, wherein each of the multiple power supply control signals corresponds to a unique one of the multiple supplies.

* * * * *

INTER PARTES REEXAMINATION CERTIFICATE (0270th)

United States Patent
May et al.

(10) Number: US 6,366,522 C1
(45) Certificate Issued: Jun. 7, 2011

(54) METHOD AND APPARATUS FOR CONTROLLING POWER CONSUMPTION OF AN INTEGRATED CIRCUIT

(75) Inventors: Marcus W. May, Austin, TX (US); Daniel Mulligan, Austin, TX (US)

(73) Assignee: Silicon Valley Bank, Santa Clara, CA (US)

Reexamination Request:
No. 95/000,197, Nov. 22, 2006

Reexamination Certificate for:
Patent No.: 6,366,522
Issued: Apr. 2, 2002
Appl. No.: 09/716,616
Filed: Nov. 20, 2000

(51) Int. Cl.
*G06F 1/26* (2006.01)

(52) U.S. Cl. .................. 365/227; 713/320; 713/322
(58) Field of Classification Search .................. None
See application file for complete search history.

(56) References Cited

U.S. PATENT DOCUMENTS

| | | |
|---|---|---|
| 4,691,124 A | 9/1987 | Ledzius et al. |
| 4,752,699 A | 6/1988 | Cranford, Jr. et al. |
| 5,392,205 A | 2/1995 | Zavaleta |
| 5,812,860 A | 9/1998 | Horden et al. |
| 6,141,762 A | 10/2000 | Nicol et al. |
| 6,425,086 B1 | 7/2002 | Clark et al. |
| 6,664,775 B1 | 12/2003 | Clark et al. |

FOREIGN PATENT DOCUMENTS

EP 0 632 360 A1 1/1995

OTHER PUBLICATIONS

Cirrus Logic, EP7209 Preliminary Data Sheet, DS453PP0.1, ver 0.1 (May 1999).
Gutnik, Vadim, et al., Embedded Power Supply for Low-Power DSP, IEEE Transactions on VLSI Systems, vol. 5, No. 4, pp. 425–435 (Dec. 1997).
Gutnik, Vadim, et al., An Efficient Controller for Variable Supply-Voltage Low Power Processing, Symposium on VLSI Circuits Digest of Technical Papers (1996).
Burd, Thomas D., et al., A Dynamic Voltage Scaled Microprocessor System, IEEE Int'l Solid–State Circuits Conference (Feb. 2000).
Burd, Thomas D., et al., Presentation Slides of "A Dynamic Voltage Scaled Microprocessor System," presented at IEEE Int'l Solid–State Circuits Conference (Feb. 9, 2000), available at http://bwrc.eecs.berkeley.edu/Publications/2000/presentations/IEEE_ISSCC_2000/ISSCC-00-Slides.pdf [hereinafter *Burd Presentation Slides*].

(Continued)

*Primary Examiner* — My-Trang Nu Ton

(57) ABSTRACT

A method and apparatus for controlling power consumption of an integrated circuit include processing that begins by producing a system clock from a reference clock based on a system clock control signal. The reference clock may be generated from an external crystal oscillator circuit operable to produce a reference clock at a desired frequency. The processing continues by regulating at least one supply from a power source and an inductor based on a power supply control signal. The processing continues by producing the system clock control signal and the power supply control signal based on a processing transfer characteristic of a computational engine and processing requirements associated with processing at least a portion of an application by the computational engine.

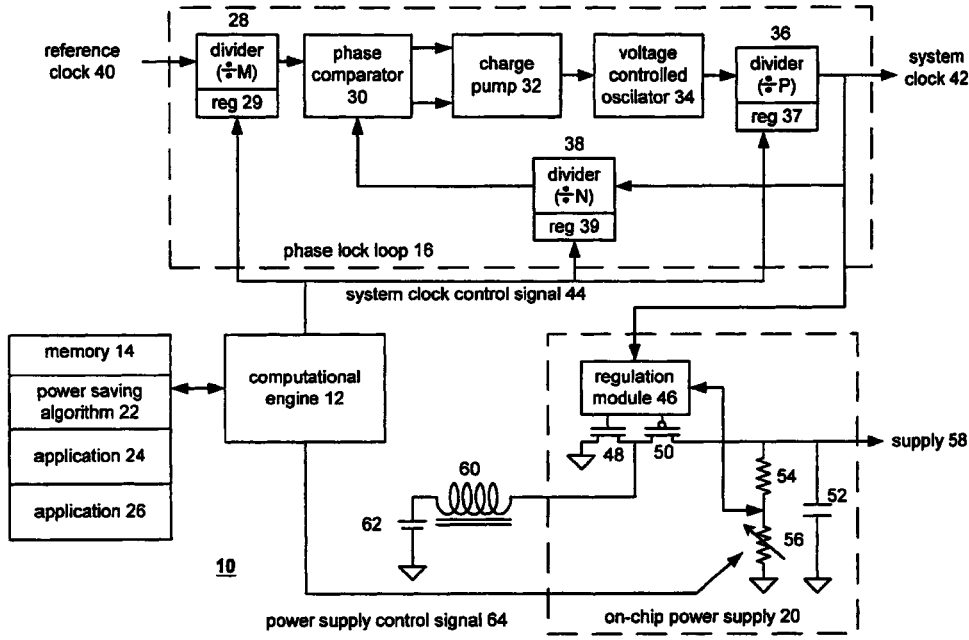

OTHER PUBLICATIONS

Burd, Thomas D., et al., A Dynamic Voltage Scaled Microprocessor System, IEEE Int'l Solid–State Circuits Conference, vol. 35, No. 11, pp. 1571–1580 (Nov. 14, 2000).

Wei, Gu–Yeon, et al., A Low Power Switching Power Supply for Self–Clocked Systems, ISPLED 1996, pp. 313–317.

Goodman, James, et al., An Energy/Security Scalable Encryption Processor Using an Embedded Variable Voltage DC/DC Converter, IEEE Jornal of Solid–State Circuits, vol. 33, No. 11 (Nov. 1998).

Min, Rex, et al., Dynamic Voltage Scaling Techniques for Distributed Microsensor Networks, WVLSI, IEEE Computer Society Annual Workshop on VLSI (Apr. 2000), available at: http://doi.ieeecomputersociety.org/10.1109/IWV.2000.844528 [hereinafter *Min*].

Min, Rex, et al., Presentation Slides of "Dynamic Voltage Scaling Techniques for Distributed Microsensor Networks," WVLSI, IEEE Computer Society Annual Workshop on VLSI (Apr. 27, 2000), available at http://www–mtl.mit.edu/researchgroups/icsystems/pubs/ conferences/2000/min_wvls100_slides.pdf [hereinafter *Min Presentation Slides*].

Dancy, Abram, et al., Techniques for Aggressive Supply Voltage Scaling and Efficient Regulation, IEEE Custom Integrated Circuits Conference, pp. 579–586 (1997).

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2 and 6-8 is confirmed.

Claims 9 and 16 are determined to be patentable as amended.

Claims 10-15, 17, 18 and 20-22, dependent on an amended claim, are determined to be patentable.

New claims 23-38 are added and determined to be patentable.

Claims 3-5 and 19 were not reexamined.

9. A method for controlling power consumption of an integrated circuit, the method comprises the steps of:
producing a system clock from a reference clock based on a system clock control signal;
regulating at least one supply from [at least one of: a linear regulator and] a power source and an inductance based on a power supply control signal; and
producing the system clock control signal and the power supply control signal based on a processing transfer characteristic of a computation engine and processing requirements associated with processing at least a portion of an application by the computation engine.

16. An apparatus for controlling power consumption of an integrated circuit, the apparatus comprises:
a processing module; and
memory operably coupled to the processing module, wherein the memory includes operational instructions that cause the processing module to:
produce a system clock form a reference clock based on a system clock control signal;
regulate at least one supply from [at least one of: a linear regulator and] a power source and an inductance based on a power supply control signal; and
produce the system clock control signal and the power supply control signal based on a processing transfer characteristic of a computation engine and processing requirements associated with processing at least a portion of an application by the computation engine.

23. *The power efficient integrated circuit of claim 1, wherein the computational engine produces the power supply control signal to provide the at least one supply selectively at a voltage greater than or less than a voltage of the power source.*

24. *The power efficient integrated circuit of claim 23, wherein the on-chip power supply control module comprises:*
*a first transistor having a first current electrode for providing a first supply, a control electrode, and a second current electrode adapted to be coupled to the inductance;*
*a second transistor having a first current electrode coupled to the second current electrode of the first transistor, a control electrode, and a second current electrode coupled to a power supply reference terminal; and*
*a regulation module having a first output coupled to the control electrode of the first transistor, and a second output coupled to the control electrode of the second transistor, wherein the regulation module controls a duty cycle of the first and second outputs to provide the first supply.*

25. *The power efficient integrated circuit of claim 1, wherein the inductance is an external inductance.*

26. *The power efficient integrated circuit of claim 1, wherein the on-chip power supply control module has a clock input for receiving the system clock.*

27. *The power efficient integrated circuit of claim 26, wherein the phase lock loop produces the system clock based on the system clock control signal and subsequently the on-chip power supply control module regulates the at least one supply based on the power supply control signal.*

28. *The power efficient integrated circuit of claim 7, wherein the programmable divider circuit comprises a resistor divider circuit.*

29. *The method of claim 9, further comprising the step of producing the power supply control signal to provide the at least one supply selectively at a voltage greater than or less than a voltage of the power source.*

30. *The method of claim 9, wherein the step of regulating further comprises regulating the at least one supply from the power source and an external inductance based on the power supply control signal.*

31. *The method of claim 30, wherein the step of regulating further comprises the step of:*
*alternatively switching a first terminal of the external inductance between an output terminal that provides the at least one supply, and a power supply reference terminal, in response to the power supply control signal.*

32. *The method of claim 31, further comprising performing the step of alternatively switching based in part on the system clock.*

33. *The method of claim 9, further comprising producing the system clock based on the system clock control signal and subsequently regulating the at least one supply based on the power supply control signal.*

34. *The method of claim 14, wherein the regulating at least one supply further comprises adjusting a programmable resistor divider circuit of the on-chip power converter based on the power supply control signal.*

35. *The apparatus of claim 16, wherein the memory stores instructions that further cause the processing module to produce the power supply control signal to provide the at least one supply selectively at a voltage greater than or less than a voltage of the power source.*

36. *The apparatus of claim 16, wherein the inductance is an external inductance.*

37. *The apparatus of claim 16, further comprising:*
*a first transistor having a first current electrode for providing a first supply, a control electrode, and a second current electrode adapted to be coupled to the inductance;*
*a second transistor having a first current electrode coupled to the second current electrode of the first transistor, a control electrode, and a second current* electrode coupled to a power supply reference terminal; and a regulation module having a first output coupled to the control electrode of the first transistor, and a second output coupled to the control electrode of the second transistor, wherein the regulation module controls a duty cycle of the first and second outputs to provide the first supply.

38. The apparatus of claim 21, wherein the programmable divider circuit comprises a resistor divider circuit.

* * * * *